US006538416B1

(12) United States Patent
Hahne et al.

(10) Patent No.: US 6,538,416 B1
(45) Date of Patent: Mar. 25, 2003

(54) BORDER GATEWAY RESERVATION PROTOCOL FOR TREE-BASED AGGREGATION OF INTER-DOMAIN RESERVATIONS

(75) Inventors: Ellen L. Hahne, Westfield, NJ (US); Ping P. Pan, Emerson, NJ (US); Henning G. Schulzrinne, Leonia, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/418,702

(22) Filed: Oct. 15, 1999

Related U.S. Application Data

(60) Provisional application No. 60/123,434, filed on Mar. 9, 1999.

(51) Int. Cl.[7] ............................................. H04L 12/28
(52) U.S. Cl. ...................................... 320/431; 209/238
(58) Field of Search ............................. 370/431, 438, 370/395–397, 235, 429, 218–225, 310, 345–355, 522, 254; 709/236–238, 240–242, 246, 250, 220–226

(56) References Cited

U.S. PATENT DOCUMENTS

| | | | | |
|---|---|---|---|---|
| 5,987,018 A | * | 11/1999 | Freeburg et al. | 370/345 |
| 6,091,737 A | * | 7/2000 | Hong et al. | 370/431 |
| 6,141,319 A | * | 10/2000 | Dighe et al. | 370/218 |
| 6,185,210 B1 | * | 2/2001 | Troxel | 370/395 |
| 6,343,326 B2 | * | 1/2002 | Acharya et al. | 709/238 |
| 6,449,647 B1 | * | 9/2002 | Colby et al. | 709/226 |
| 6,466,985 B1 | * | 10/2002 | Goyal et al. | 709/238 |

OTHER PUBLICATIONS

D. Awduche, L. Berger, D. Gan, T. Li, G. Swallow, and V. Srinivsan, "Extensions to RSVP for LSP Tunnels," Internet Draft, Internet Engineering Task Force, Nov. 1998. Work in progress.

S. Herzog, R. Guerin, and S. Blake, "Aggregating RSVP–based QoS Requests," Internet Draft, Internet Engineering Task Force, Nov. 1997. Work in progress.

L. Zhang, S. Deering, D. Estrin, S. Shenker, and D. Zappala, "RSVP: A New Resource ReSerVation Protocol," *IEEE Network*, vol. 7, pp. 8–18, Sep. 1993. OCLC 14393593 ISSN 0890–8044.

B. Braden, L. Zhang, S. Berson, S. Herzog, and S. Jamin, "Resource ReServVation Protocol (RSVP)—Version 1 Functional Specification," RFC 2205, Internet Engineering Task Force, Sep. 1997.

(List continued on next page.)

*Primary Examiner*—Wellington Chin
*Assistant Examiner*—Prenell Jones
(74) *Attorney, Agent, or Firm*—Fay, Sharpe, Beal, Fagan, Minnich & McKee

(57) ABSTRACT

A reservation is created within a network by sending a stateless probe from a source node toward a destination node. The stateless probe determines a reservation path between the source node and the destination node via intermediate routers in the network. A determination is made if the destination node agrees to create the reservation path to the source node. If the destination node agrees to create the reservation path to the source node, the reservation path is established by returning a corresponding response message to the source node. Links included in more than one established reservation path to the same destination node are identified. The multiple reservations on such links are aggregated. This aggregation creates a tree of reservations rooted at the destination node.

22 Claims, 4 Drawing Sheets

OTHER PUBLICATIONS

O. Schelen and S. Pink, "Aggregation Resource Reservations over Multiple Routing Domains," in *Proc. of IFIP Fifth International Workshop on Quality of Service (IWQOS '98)*, 1998.

F. Reichmeyer, L. Ong, A. Terzis, L. Zhang, and R. Yavatkar, "A Two–Tier Resource Management Model for Differentiated Services Networks," Internet Draft, Internet Engineering Task Force, Nov. 1988. Work in progress.

S. Shenker and L. Breslau, "Two Issues in Reservation Establishment," in SIGCOMM *Symposium on Communications Architectures and Protocols,* (Cambridge, Massachusetts), Sep. 1995. OCLC 30120742.

Y. Rekhter and T. Li, "An Architecture for IP Address Allocation with CIDR," RFC 1518, Internet Engineering Task Force, Sep. 1993.

P. Pan, E. Hahne, H. Schulzrinne, "BGRP: A Tree–Based Aggregation Protocol for Inter–Domain Reservations," *Columbia Univ. Computer Science Technical Report No. CUCS–029–99,* Dec. 7, 1999.

* cited by examiner

BORDER GATEWAY RESERVATION PROTOCOL FOR TREE-BASED AGGREGATION OF INTER-DOMAIN RESERVATIONS

This application claims the benefit of U.S. Provisional Application No. 60/123,434, filed Mar. 9, 1999.

BACKGROUND OF THE INVENTION

The present invention relates to resource reservations within a distributed network. It finds particular application in conjunction with setting-up and maintaining reservations within the Internet, and will be described with particular reference thereto. It will be appreciated, however, that the invention is also amenable to other like applications.

A resource reservation enables guaranteed communication between end-to-end resources (e.g., a source and a destination). Such guaranteed communication is critical for time-sensitive applications including Internet telephony, multimedia-on-demand, and interactive computer games.

The deployment of inter-domain resource reservations in the Internet has been delayed by the desire of each carrier to control its own routing and resource management policies. Carriers appear to prefer having relatively narrow interfaces to the rest of the Internet. One drawback to such narrow interfaces is that they only present a limited amount of network connectivity and resource sharing information at a network's borders.

The size of the Internet has grown rapidly over the past several years. This growth is expected to continue into the future. As the Internet grows, the processes involved with creating and maintaining resource reservations across the network become more complicated. The increased complexity tends to slow down the formation of resource reservations and requires more network resources for maintaining the reservations once they are created. Therefore, it is desirable to scale resource reservation protocols with the size of the Internet.

Inter-domain resource reservations must satisfy a number of criteria in order to scale with the expanding Internet. More specifically, resource reservations must reduce the storage of reservation information, reduce the cost of processing reservation messages, reduce the bandwidth consumed by reservation information, and simplify the delivery commitments to peering domains.

Routers store reservation control information tables and packet classifier tables. The size of these tables is typically a function of the number of end users n. In conventional systems, the reservation control information tables and packet classifier tables include $n^2$ entries. Considering the growth of the Internet, such table sizes are becoming unmanageable.

The cost of processing reservation messages depends on the complexity of handling each message and the frequency of reservation messages. Conventional end-applications set-up reservations across domains. Therefore, reservation updates are relatively frequent. Along with increasing Internet traffic, frequent reservation updates also increase the cost of processing reservation messages.

Ideally, bandwidth consumed by reservation information exchange is small relative to the link bandwidth, both in steady state and with routing transients. This bandwidth overhead is typically proportional to the number of states kept in routers. Because the number of states kept in the routers is $n^2$ (where n is the number of users), bandwidth overhead is becoming a significant factor as the Internet continues to grow.

It is desirable that each domain manage its own network resources and enforce its own internal traffic engineering policies. This implies that a domain only reveals simple delivery commitments to its peering domains. The inter-domain reservation then uses these delivery commitments to establish a reservation path through multiple domains. Each domain sets-up transit reservation flows using its preferred intra-domain reservation mechanism. As the Internet grows, a need exists for connecting multiple reservation segments from various domains together in a more efficient manner.

Both router-based and server-based systems have presented scalable resource reservations. However, as discussed below, these systems include various drawbacks.

Current router-based approaches are available that modify the conventionally used reservation protocol ("RSVP") to support scalable reservations. These router-based approaches allow routers to aggregate individual reservation requests. However, they do not address state storage scaling issues (e.g., aggregated reservations are received in RSVP Sender Template and Session pairs). Furthermore, these conventional router-based approaches set-up reservations between every pair of domains that communicate via reserved flows. Therefore, the storage states scale as a function of the square of the communicating domains. Given that there are currently more than 4,500 domains, such a condition is undesirable.

In current server-based approaches, a bandwidth broker (or agent) in each domain is responsible for selecting and setting-up aggregated reservation sessions. This approach has the advantage of removing message processing and storage burdens from the routers. However, synchronizing reservation information among the bandwidth brokers and the border routers is a complex process. Furthermore, the processing overhead remains (and is simply moved to a different network entity). Also, there is a potential that a new single point of failure for the entire domain is introduced.

Two-tier reservation models have also been proposed. In these models, intra-domain reservation protocols are used within a domain to set-up reserved flows between senders and receivers. Inter-domain reservation protocols set-up coarsely-measured reserved flows between domains. Although two-tier models have been proposed, the actual mechanisms for implementing these models have not been defined.

The present invention provides a new and improved apparatus and method which overcomes the above-referenced problems and others.

SUMMARY OF THE INVENTION

A method creates a reserved communication tree for state aggregation. A stateless probe, which requests a specified bandwidth, is sent from a leaf router toward a root router within a network. The stateless probe discovers a communication path, potentially including intermediate routers, between the leaf router and the root router. A graft message is returned from the root router to the leaf router along the communication path. A bandwidth reservation is created within each of the routers through which the graft message travels. Each of the bandwidth reservations is as large as the specified amount and is associated with an adjacent router in the communication path. A reserved communication path is established within the network. The reserved communication path includes the root router, any of the intermediate routers, the leaf router, and a bandwidth reservation for each of the routers along the reserved communication path. The established communication path is aggregated with other established communication paths to form a reserved communication tree.

One advantage of the present invention is that it aggregates individual reservation requests.

Another advantage of the present invention is that it scales, in terms of state storage, processing, and bandwidth, as a function of the number of communicating domains.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
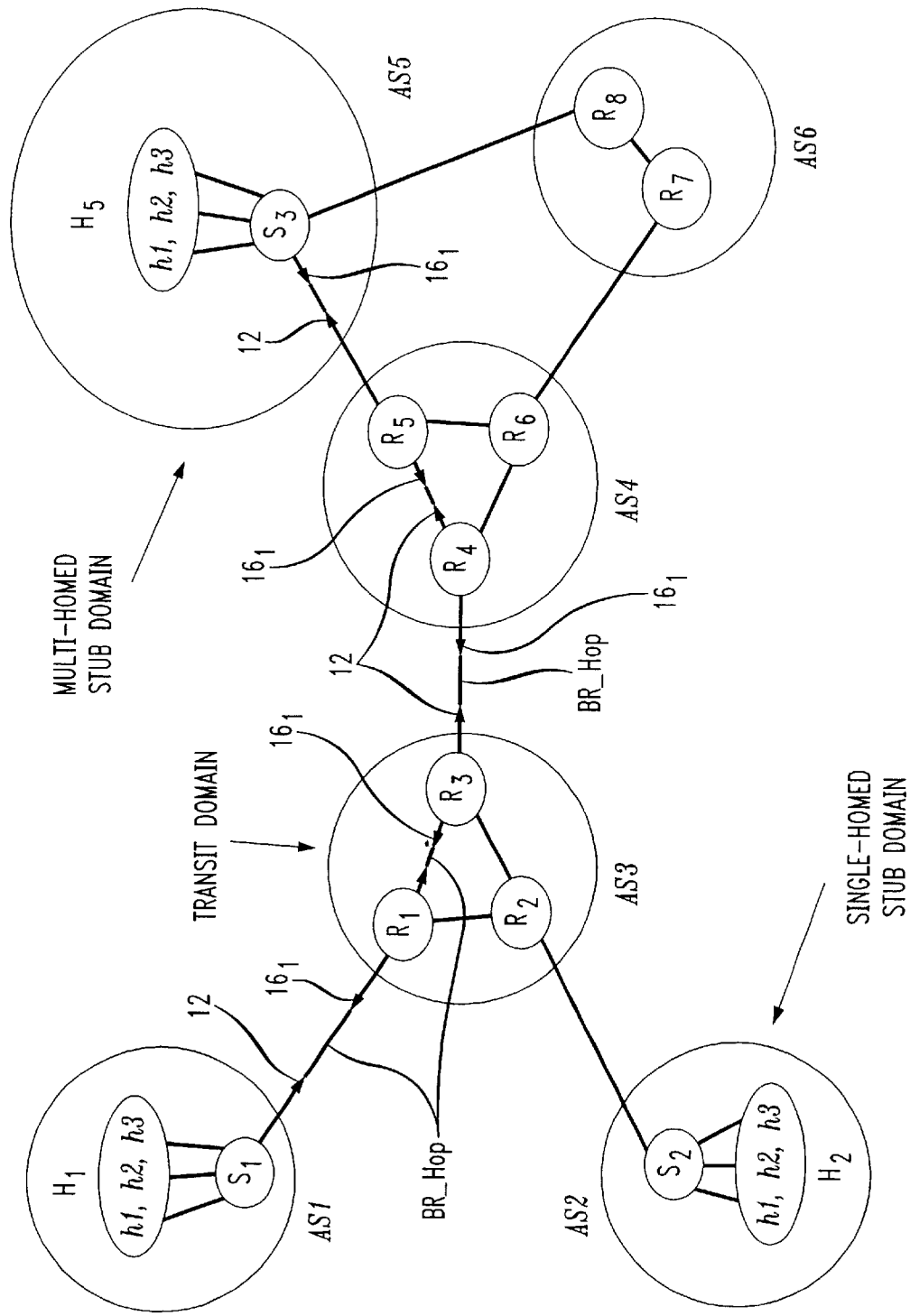
FIG. 1 illustrates domains connected in a network.

With reference to FIG. 1, a network 10 (e.g., the Internet) includes a number of domains AS that exchange user traffic between each other. Each domain AS is under a common administration, and has a unique identifier (e.g., Autonomous System ("AS") number) AS1, AS2, . . . AS6.

Domains AS in the Internet 10 are typically classified as either a stub domain AS1, AS2, AS5 or a transit domain AS3, AS4, AS6. A domain is a stub domain if the path connecting any two (2) routers i and j goes through that domain only if either i or j is in that domain. Transit domains do not have such a restriction. Each domain AS connects to a number of domains via border routers R, S.

$R=\{R_1, R_2, \ldots, R_n\}$ is defined to be a set of border routers in the transit domains AS3, AS4, AS6. $S=\{S_1, S_2, \ldots, S_m\}$ is defined to be a set of border routers in the stub domains AS1, AS2, AS5. $H=\{h1, h2, \ldots, h_j\}$ is a set of end hosts in the domains AS.

In each domain, the border routers R, S control the access to network resources. The admission control is accomplished via both resource reservation protocols and some policy-based admission control functions. Specifically, the stub domain border routers S are responsible for interfacing between end host reservations and inter-domain aggregated reservations. Transit domain border routers R are responsible for processing the inter-domain requests. The routers S act as a source and a sink for inter-domain reservations. In FIG. 1, all active end hosts are in pure stub domains AS1, AS2, AS5. However each of the border routers R in the transit domains AS3, AS4, AS6 must also act as border routers S for any end hosts in their respective domains that are communicating across domains AS. These end hosts are not shown in FIG. 1.

Control packets sent from a source to a sink are defined as traveling downstream. Conversely, control packets sent from a sink to a source are defined as traveling upstream.

Assumptions

Before presenting the reservation protocol of the present invention, which is known as the Border Gateway Reservation Protocol ("BGRP"), some key issues behind the design will be discussed.

In the preferred embodiment, the BGRP operates only between border routers R, S. A BR_Hop denotes a "virtual hop" between two (2) "adjacent" border routers participating in the BGRP. It is to be understood that the adjacent border routers could either be in different domains (e.g., at the two (2) ends of a trans-domain link) or in the same domain. BGRP does not set-up intra-domain resource reservations, which instead is the responsibility of intra-domain traffic management. Therefore, BGRP is consistent with a two-tier reservation architecture.

An Internet Service Provider ("ISP") determines how many physical resources to actually reserve within its domain for an aggregated/multiplexed reservation. Extremely conservative ISP's simply sum the bandwidth and buffer requirements of the individual flows (e.g., sum the peak rates, sum the mean rates, and sum the token bucket depths). In practice, it is exceedingly likely that ISP's take advantage of statistical multiplexing when managing their networks. However, statistical multiplexing is beyond the scope of the present invention. Therefore, in the preferred embodiment, reservations are only for bandwidth, with no consideration for burstiness, buffers, or buckets, and an aggregated reservation is the sum of its constituent reservations.

Each flow with a reservation is policed at the edge of the network. This assumption limits the harm the one flow inflicts on another flow when reservations are aggregated within the network.

BGRP does not allow partial reservations of any type. Unless all the resources needed for a particular flow are reserved at every hop in the path, the reservation fails.

The delivery of BGRP messages is assumed to be reliable (e.g., TCP could be used). Furthermore, it is assumed that reservations use soft-state.

BGRP Highlights

To set-up a reservation, the BGRP of the present invention requires two (2) control messages (i.e., a PROBE message and a GRAFT message). The PROBE messages select (i.e., determine or discover) a reservation (i.e., communication) path within the network according to conventional routing techniques. The GRAFT messages (i.e., response messages) establish and set-up the actual reservations. The PROBE and GRAFT messages specify the desired reservation parameters in terms of rate and traffic class.

At first glance, BGRP may appear similar to RSVP, in which senders and receivers periodically generate PATH and RESV messages to set-up and maintain reservations. However, the PATH message is only intended to install the appropriate routing state so that RSVP runs on top of any routing protocol. In the present invention, as the PROBE messages travel downstream from the respective sources of the reservation, instead of installing the routing state at intermediate routers, the PROBE messages collect routing information along the path. The intermediate routers do not store any information. When the PROBE message arrives at a border router, that router accesses the domain's resource management and policy database to determine if the network should accept the reservation. More specifically, as the PROBE message passes through the routers, each router determines if it is capable of accommodating the amount (i.e., size) of the bandwidth requested in the reservation. If the router can accommodate the bandwidth, the PROBE message is routed to a subsequent router in the network.

If the network cannot accommodate the reservation, a rejection message is returned to the source router and the PROBE message is not forwarded any further downstream.

If, on the other hand, the network can accommodate the reservation, the reservation sink sends a GRAFT message upstream. The GRAFT message uses the previously collected routing information and traverses exactly the reverse direction of the corresponding PROBE message. When a router forwards the GRAFT message to an upstream router, the upstream router reserves the specified amount of bandwidth on the communication link between the two routers. The routers on the path aggregate the reservations along a sink-based tree, where the reservation sink is referred to as a root and all the reservation sources are referred to as leaves. This form of aggregation adds the resource reservations, as opposed to the merging/sharing of reservations performed by RSVP.

Routers only need to store the reservation information for the sinks, but not sources. Hence, it potentially reduces the maximum number of reservation flows at each of the routers from $S^2$ to $S$, where $S$ is the total number of reservation nodes in the network.

Only border routers process the inter-domain reservation messages. The PROBE and GRAFT messages are reliably delivered between border routers. Each stub domain border router $S_i$ originates and terminates the reservation messages, and keeps track of the reservation flows on a per-flow basis. Each transit domain border router $R_i$ is responsible for reservation aggregation and interfaces with intra-domain protocols to set-up transit reservation trunks (i.e., communication paths).

BGRP Interfaces

In the preferred embodiment, the data forwarding path uses Differentiated Services. Packets are aggregated into a very small number of classes (e.g., about four (4)), which are queued separately.

BGRP conducts inter-domain traffic management. Furthermore, BGRP interfaces with intra-domain traffic management, which talks to local link traffic control. When it is necessary, the local link traffic control tunes the local link scheduler. These adjustments to the link scheduler are very coarse. In fact, the adjustments act as a re-allocation of "server bandwidth" among a very few scheduling queues (one for each Differentiated Services class).

BGRP makes admission control decisions that are communicated back to the first border router, at the edge of the network, which installs any fine-grained filters (meters, droppers, shapers, demoters, etc.) needed for policing. BGRP introduces no additional needs for fine-grained classifiers/policers/conditioners inside the core network.

When the PROBE message arrives at a border router, the router accesses the domain's resource management and policy database to determine if the network should accept the reservation. Likewise, the GRAFT message involves a similar check.

Reservations in BGRP are based on routing aggregation direction. Packets are forwarded based on the traditional routing look-up, but are sent with Differentiated Services treatment. Thus, there is no need for an extra packet classification at core routers. BGRP depends on updates from the routing process in order to update the BGRP control state in a timely manner.

BGRP operates in a hierarchical framework and manages resources reservations between domains. The reservation/admission-control activities in BGRP's virtual "network" of border routers are translated into corresponding reservation/admission-control activities within each domain. Furthermore, the reservation/admission-control activities are translated independently along each path from one (1) border router to another. Each ISP decides how to conduct these intra-domain activities. For example, an ISP may use MPLS tunnels, RSVP tunnels, or even an intra-domain version of BGRP.

If the sending and receiving hosts use RSVP to request end-to-end reservations, then the RSVP messages themselves would be used to set-up reservations between the end hosts and the associated border routers. To establish the missing link across the core network, it is contemplated that the flow's reservation is folded into a BGRP aggregate reservation.

BGRP in Detail

For each aggregated reservation, a border router tracks the following states: 1) amount of resource (bandwidth) reserved, 2) Differentiated Services traffic class, 3) sink border router identification ("ID"), 4) ID's of previous BR_Hops, and 5) ID of next BR_Hop.

Furthermore, the first and last border routers may choose to keep the full route record for each flow. Such data is useful for a variety of reasons: 1) for interfacing to end-to-end RSVP, 2) for constructing fewer, fatter trees, in which reservations for different CIDR blocks that happen to follow the same sequence of border routers are aggregated together, and 3) for tearing down a per-flow reservation in either direction, which is more economical that waiting for soft-state to time-out. While the preferred embodiment of BGRP discloses a soft-state network that is refreshed at predetermined periods of time, it is also contemplated to actively "tear-down" reservations between border routers.

Figure 2:
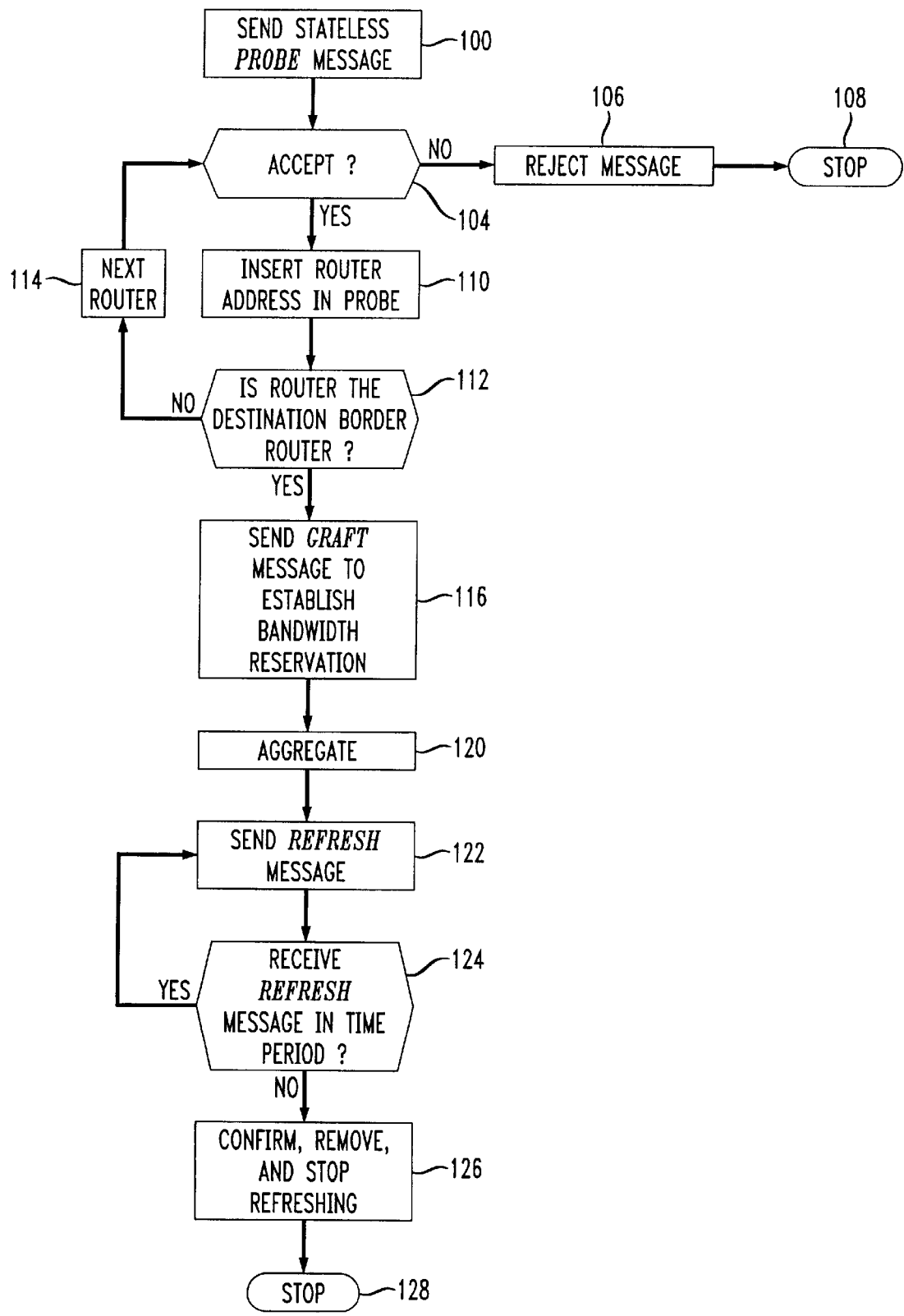
FIG. 2 illustrates the steps for creating a reservation according to the present invention.

The PROBE messages include fields relating to the source identification, the destination network, the source's reservation level, and the path routing information (or route records). FIGS. 1 and 2 illustrate the probing process.

Assume that a source router $H_1$ in AS1 desires to set-up a reservation to a destination router $H_5$ in AS5. In a step 100, leaf border router $S_1$ sends a stateless PROBE message 12 having the following fields: 1) $S_1$, 2) $H_5$, 3) reservation bandwidth and traffic class, and 4) route record, which, at this point, is null. The PROBE message 12 is routed through the network 10 according to conventional routing techniques.

When the PROBE message 12 arrives at the border router $R_1$, the router $R_1$, in a step 104, accesses the domain's resource management and policy database and the bilateral agreement between AS1 and AS3 to determine if the network should accept the reservation. If not, $R_1$ sends a rejection message to $S_1$ in a step 106 and the process is stopped in a step 108. Otherwise, $R_1$ inserts its own IP address in the route record field in a step 110. Next, a determination is made in a step 112 if the current router is the destination border router $S_3$ for the destination $H_5$ (e.g., if the router includes the destination's address). If the current router is not the destination border router $S_3$ for $H_5$, the PROBE 12 is directed to a downstream border router in a step 114. The selection of the downstream router depends on the local traffic engineering requirements. In the present example, $R_1$ relays the message to $R_3$ in the step 114.

The PROBE message 12 is treated similarly in the routers $R_3$, $R_4$, and $R_5$. Each of the routers checks for reservation loops. The loop detection procedure includes scanning the route record and checking that the route record does not include the router's address. If loops are found, the routers reject the probing messages.

When the router $S_3$ receives the PROBE message 12, the determination is made in the step 112 that $H_5$ belongs to the local network. Hence $S_3$ is the root. The final route record in the PROBE message is a sequence including $R_1$, $R_3$, $R_4$, $R_5$. Then, in a step 116, the root border router $S_3$ returns a GRAFT message $16_1$ to the leaf border router $S_1$ via the same path the PROBE message was sent. The GRAFT message $16_1$ establishes the reservation for the requested bandwidth.

The necessity for reservation probing is justified because each transit domain engineers its network such that it can optimize the utilization of network resources because of the high cost of network assets. At the same time, due to the commercial nature of Internet services, the stub domains must have knowledge of network resources and service availability before setting-up an inter-domain reservation trunk. Reservation probing provides a simple and accurate mechanism for stub domains to discover a feasible reservation path crossing multiple domains before each reservation. It is important to note that the reservation probing in BGRP requires network routers to perform admission control for a particular service and resource request.

The total processing overhead is manageable. More specifically, only border routers handle the probing messages and the "trusted" stub domain border routers control the frequency of probing messages. Routers do not keep any probing state and, therefore, there is no associated storage overhead.

The GRAFT messages $16_1$ include the following fields: sink identification $S_3$, source identification $S_1$, reservation bandwidth $BW_{1,3}$ and traffic class, and route record $R_1$, $R_3$, $R_4$, $R_5$. The GRAFT messages are delivered between the border routers R, S. When the GRAFT messages arrive at a router $R_i$, the router uses its intra-domain reservation protocols to update the internal reservation with its adjacent border router, which is listed in the route record field. Then $R_i$ forwards the GRAFT message in the upstream direction to the adjacent border router.

When multiple reserved paths are being set-up in the network, a reservation aggregation operation may need to be performed by the border routers R in a step 120. For example, suppose that a reservation having bandwidth $BW_{1,3}$ has already been established between $S_1$ and $S_3$ in FIG. 4, and assume that $S_2$ now desires to set-up an additional reservation from $S_2$ to $S_3$ having bandwidth $BW_{2,3}$. After the probing process from $S_2$ to $S_3$ is performed, $S_3$ launches a GRAFT message $16_2$ back toward $S_2$. Let us consider bandwidth reservations on link 22, which is the communication channel between adjacent routers $R_4$ and $R_5$. When router $R_5$ receives the GRAFT message, $R_5$ recognizes that a bandwidth reservation already exists on the link 22 for the sink $S_3$. Rather than creating a new reservation on the link 22, $R_5$ triggers the intra-domain protocols to modify the existing reservation to $R_4$. This process is known as reservation aggregation. Consequently, the resulting aggregate reserved bandwidth on the link 22 between $R_4$ and $R_5$ becomes $BW_{1,3}+BW_{2,3}$. Furthermore, the reservation is similarly established or modified in the other border routers $R_3$, $R_2$ and the source border router $S_2$. The additional reservation is established when the GRAFT message arrives at $S_2$.

Figure 3:
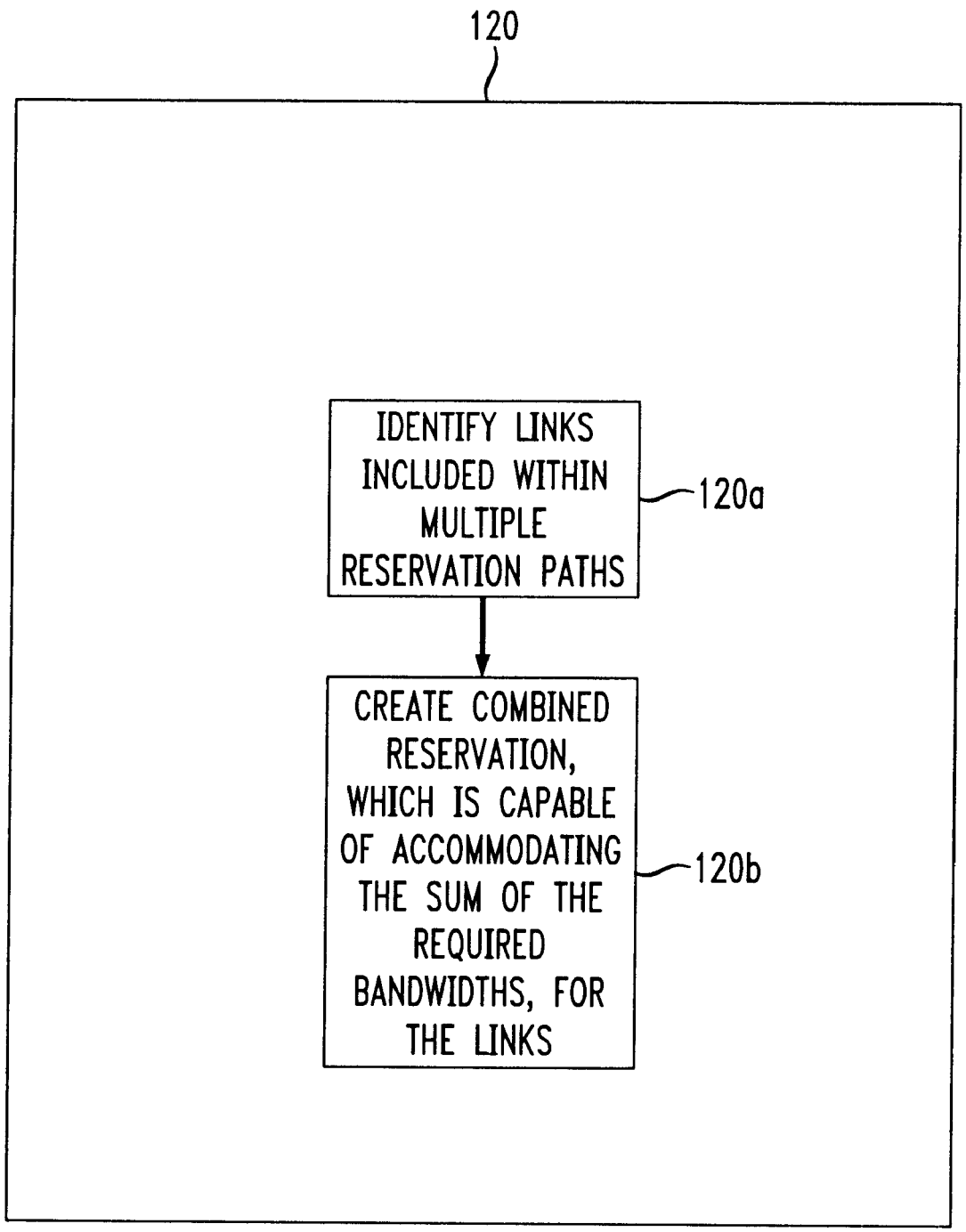
FIG. 3 illustrates the steps for aggregating bandwidth.

The specific steps involved in aggregating reservations are shown in FIG. 3. Step 120a identifies any pair of adjacent routers whose connecting link has multiple reservation paths toward the same sink router. Then, in a step 120b, these adjacent routers form a combined reservation on that link. The combined reservation is capable of accommodating the sum of the reserved bandwidths. Since all eligible router pairs perform this combining operation, the collection of probed paths to one sink router are thereby transformed into a reservation tree rooted at that sink router.

If a router Ri, upon receiving a GRAFT message, cannot set-up the associated reservation, the router Ri generates an error message informing the sink $S_3$ of the failure. The error message travels back to the sink $S_3$ and removes the previously established reservations along the path.

As discussed above, BGRP sends a PROBE message and a GRAFT message between a leaf border router and a root border router for each new flow requiring a reservation. Furthermore, the death of a flow may trigger an optional tear-down message. Since these messages consume processing and bandwidth, it is desirable to reduce the control message volume, and thereby add another dimension of scalability to BGRP. This dimension is added through the following contemplated modifications to BGRP:

CIDR Labeling: Label branches of the reservation tree with the CIDR prefixes associated with the tree root. In this manner, an advancing PROBE message recognizes when it hits the reservation tree it desires to join.

Over-Reservation: Allow at least some tree nodes to routinely reserve more bandwidth between themselves and the tree root than is currently required, by inflating the bandwidth parameter in the PROBE message.

Standard Techniques of Thresholds and Hysteresis: A tree node should only reserve more bandwidth between itself and the root if the node has an immediate need, or if the amount of bandwidth it intends to request exceeds a threshold.

For this quantized version of BGRP, the first tree node reached by the PROBE that has over-reserved sufficient resources from itself to the root can handle the reservation request. The tree node launches the GRAFT message, which makes a reservation from the tree node back to the source border router. When the time comes for periodic refreshing of the aggregate reservations between the grafting node and the root, still more resources are over-reserved.

Figure 4:
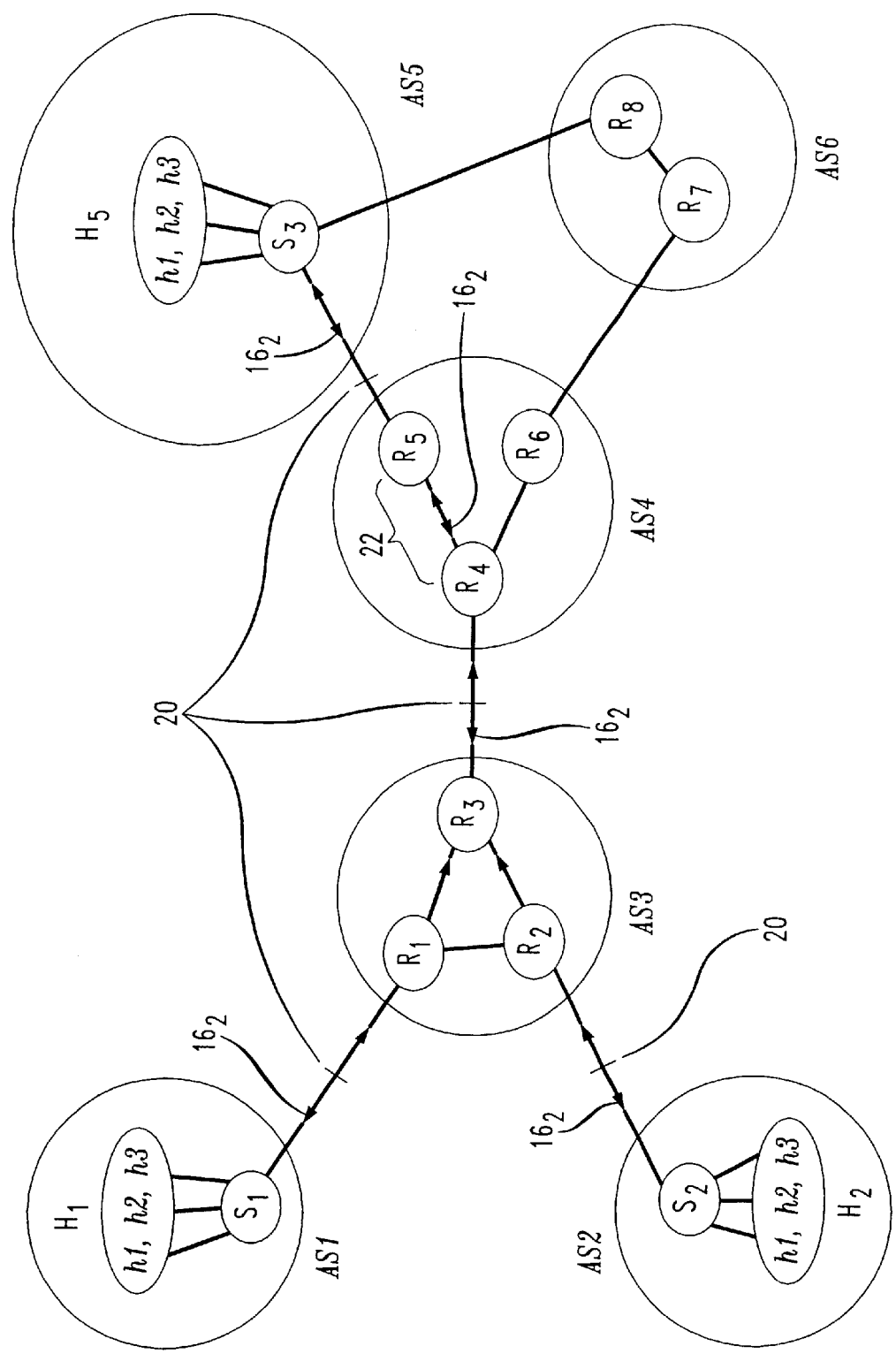
FIG. 4 illustrates reservation paths in the network shown in FIG. 1.

The concept of over-reservation is described in an example referencing FIG. 4. Assume that a reservation having bandwidth $BW_{3,5}$ is established between $R_3$ and $S_3$ in FIG. 4, in order to support communication between source hosts $H_3$ (not shown) in the domain $AS_3$ and destination hosts $H_5$ and $AS_5$. In this embodiment, the bandwidth $BW_{3,5}$ reserved by $R_3$ between itself and $S_3$ intentionally includes some bandwidth $BW_{3,5}^e$ in excess of that bandwidth $BW_{3,5}^r$ actually required for communication currently taking place between $H_3$ and $H_5$. This excess bandwidth $BW_{3,5}^e$ is requested by $R_3$ in anticipation of additional future bandwidth requests to destination hosts $H_5$. Assume that router $S_2$ desires to set-up a reservation having bandwidth $BW_{2,5}$ from the source hosts $H_2$ in the domain AS2 to the destination hosts $H_5$ in $AS_5$. A PROBE message is launched by $S_2$ toward $S_3$. When the next router $R_2$ receives this stateless probe, $R_2$ checks whether it has already reserved sufficient excess bandwidth between itself and the root $S_3$ to accommodate the bandwidth $BW_{2,5}$ requested in the stateless probe. Because $R_2$ has made no reservations, this is not the case in the present example. Therefore, the router $R_2$ performs a second check, to see if there is sufficient unreserved bandwidth available just on the link between itself and the next router $R_3$ to accommodate $BW_{2,5}$. Then, without actually reserving that bandwidth, $R_2$ forwards the PROBE message to the next router $R_3$. This process is repeated at $R_3$.

Suppose that $R_3$ determines that the bandwidth $BW_{3,5}$ already reserved between itself and the root $S_3$ includes enough excess bandwidth $BW_{3,5}^e$ to accommodate the bandwidth $BW_{2,5}$ being requested by $S_2$, (i.e., $BW_{2,5}$ is less than or equal to $BW_{3,5}^e$). Within its own local records, $R_3$ reallocates the reserved bandwidth $BW_{3,5}$ between $R_3$ and $S_3$ as follows: the portion $BW_{3,5}^r$ required by flows from $H_3$ to $H_5$ stays the same, but $BW_{2,5}$ is subtracted from the excess portion $BW_{3,5}^e$ and is now considered reserved for the new flow from $S_2$ to $S_3$. Then, $R_3$ returns a GRAFT message to $S_2$ via $R_2$ in order to reserve bandwidth $BW_{2,5}$ along the path between $S_2$ and $R_3$. This process is referred to as "Quiet Grafting", because the new bandwidth reservation between $S_2$ and $R_3$ is grafted by $R_3$ onto the existing excess bandwidth reservation between $R_3$ and $S_3$ without any communication between $R_3$ and $S_3$.

If, on the other hand, the router $R_3$ has not reserved sufficient excess bandwidth between itself and the root $S_3$, then $R_3$ performs a second check, to make sure that the available bandwidth just on the link between itself and the next router $R_4$ is at least equal to $BW_{2,5}$. Then, $R_3$, without actually reserving and bandwidth, forwards the stateless probe to $R_4$. This process is repeated until a router is discovered which has reserved sufficient excess bandwidth between itself and the root $S_3$, or until the probe reaches the root $S_3$. Whichever router terminates the stateless probe then launches a GRAFT message back toward the leaf router $S_2$ to establish the reservation between these two routers.

In the preferred embodiment, soft-state is used to manage aggregated reservation states among the border routers R, S. Therefore, an additional control message, which is referred to as a REFRESH message 20, is required. The REFRESH message is sent in a step 122. For each reservation through border router $R_i$, $R_i$ stores the identities of the adjacent upstream (previous BR_Hop) and downstream (next BR_Hop) border routers, and schedules sending REFRESH messages to each one of the adjacent border routers, preferably at periodic time intervals. The messages identify the sink tree and contain the resource reservation information. If a router $R_i$ does not receive a REFRESH message within a specified period of time, in a step 124, by a next or a previous border router BR_Hop, the router $R_i$ verifies the failed router, removes the corresponding local resource, and stops refreshing the reservation to its own adjacent border routers (see step 126), which will likewise eventually time out. The process then stops in a step 128. Alternatively, $R_i$ actively notifies adjacent routers about the reservation changes. Another contemplated alternative is to wait for routing to discover and establish an alternate partial route around the failure, then use messages similar to PROBE and GRAFT to set-up a reservation on the new part of the path. In this manner, the failed router is by-passed.

Separate sink trees are constructed for the various traffic classes. Assuming that all network routers provide class-based service assurance, the number of packet classifier entries in each router is the number of traffic classes.

It is not uncommon that routes in the Internet converge and later diverge. It is beneficial within BGRP if the reservation sink tree is a "true tree." One option for assuring a true tree is for the border router at the tree's root to create a separate BGRP reservation tree for each sub-network (i.e., one tree for each CIDR prefix the router advertises). Another option for assuring the true tree is to locate the root of the tree as close to the destination end host as necessary to guarantee BGP aggregation of all the relevant routes/addresses. Other solutions to this route convergence/divergence problem are also contemplated.

Scaling Benefits

Tree-based aggregation achieves the following benefits:

State Scaling: At worst, the total number of reservations is proportional to the number of domains. Currently, the Internet encompasses approximately 4,500 domains. Assuming that, as in RSVP, each reservation requires 350 bytes, BGRP state consumes approximately 1.5 megabytes at each border router. This is far less than the storage space for routing protocols.

Scaling in Processing: The reduction in the number of states causes a proportional reduction in message processing:

Reduction in Number of Messages Triggered by Flow Births and Deaths: Since BGRP allows routers to over-reserve bandwidth, small reservations can join and leave the sink tree without disturbing the entire tree.

Reduction in Number of Refresh Messages: Since reservations are aggregated, there are fewer reservations, and hence fewer refreshes. Also, unlike RSVP, refresh messages in BGRP are reliably transferred hop-by-hop, reducing the needed refresh frequency. BGRP only needs the refresh mechanism for removing a state orphaned due to route changes and failures. The refresh frequency can be tuned according to the stability of the network.

Bandwidth Scaling: Since reservations are aggregated, the total amount of bandwidth required for control messages is small. For a backbone link with 4,500 trees and messages of 350 bytes sent every thirty (30) seconds, the refresh bandwidth is only 420 kilo-bits per second.

BGRP scales well in terms of state storage, processing, and bandwidth. Therefore, BGRP is suitable as an inter-domain resource reservation protocol. The use of soft-state provide robustness. Since BGRP does not interfere with the local resource management in each domain, it may be deployed without requiring changes to local resource management.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method for creating a reserved communication tree for state aggregation, comprising:

a) sending a stateless probe requesting a specified amount of a reserved bandwidth from a leaf router toward a root router within a network, the stateless probe discovering a communication path, potentially including intermediate routers, between the leaf router and the root router;

b) returning a graft message from the root router to the leaf router along the communication path;

c) creating a bandwidth reservation within each of the routers through which the graft message travels, each of the bandwidth reservations being as large as the specified amount and being associated with an adjacent router in the communication path;

d) establishing a reserved communication path, within the network, including the root router, any of the intermediate routers, the leaf router, and a bandwidth reservation for each of the routers along the reserved communication path; and e) aggregating the established communication path with other established communication paths to the root router to form a reserved communication tree.

2. The method for creating a reserved communication tree as set forth in claim 1, wherein the step e) includes:
- f) identifying links included within more than one of the established communication paths to the same router, each of the links being a communication channel between respective adjacent ones of the routers in the established communication paths; and
- g) for each of the links identified in the step f), forming a combined bandwidth reservation equal to a sum of the reserved bandwidths required for each of the established communication paths passing through the link.

3. The method for creating a reserved communication tree as set forth in claim 1, wherein the step a) includes:
- f) requesting an over-reservation at each of the routers included along the communication path, the over-reservation creating an excess bandwidth within each of the routers in the communication path.

4. The method for creating a reserved communication tree as set forth in claim 3, further including:
- g) receiving a subsequent stateless probe, requesting an additional amount of reserved bandwidth, into a current one of the intermediate routers;
- h) determining if the current intermediate router has reserved a sufficient excess bandwidth between the current intermediate router and the root router for accommodating the additional bandwidth requested in the stateless probe;
- i) if the current intermediate router has reserved the sufficient excess bandwidth, returning a corresponding graft message to the leaf router without forwarding the stateless probe to a next router; and
- j) if the current intermediate router has not reserved the sufficient excess bandwidth, sending the stateless probe to the next router, and repeating the steps g) through j) for the next router until one of i) a router having the sufficient excess bandwidth is identified and ii) the stateless probe reaches the root router.

5. The method for creating a reserved communication tree as set forth in claim 1, further including:
- f) recording, in the stateless probe, an identifier for any of the intermediate routers through which the stateless probe passes;

wherein the step b) includes:
- g) returning the graft message from the root router to the leaf router via the intermediate routers identified in the recording step.

6. The method for creating a reserved communication tree as set forth in claim 1, further including:
- f) sending refresh messages between respective adjacent routers at periodic time intervals; and
- g) deleting reservations within a router which have not been refreshed by respective adjacent routers within a specified number of the time intervals.

7. The method for creating a reserved communication tree as set forth in claim 1, further including:
- f) detecting any failed routers in the established communication paths; and
- g) if any failed routers are detected in the step f):
  - h) discovering alternate partial communication paths including alternate routers for by-passing the respective failed routers; and
  - i) establishing alternate reservation bandwidths on the alternate paths.

8. The method for creating a reserved communication tree as set forth in claim 1, further including:
- f) sending a tear down message from one of the routers to an adjacent router for tearing down a reservation between the two routers.

9. The method for creating a reserved communication tree as set forth in claim 1, wherein the step a) includes:
- f) routing the probe through the routers in the network for discovering the communication path;
- g) for each of the routers through which the probe passes, determining if the router is capable of accommodating the reservation; and
- h) if the router is capable of accommodating the reservation, routing the probe to a subsequent router in the network.

10. A system for creating a reserved communication tree for state aggregation, comprising:
- a destination included within a network;
- a root router, included within the network, directly communicating with the destination;
- a source, included within the network, communicating with the destination through the network;
- a leaf router, included within the network, directly communicating with the source, a stateless probe requesting a specified amount of reserved bandwidth being sent by the leaf router toward the root router, the stateless probe discovering a communication path between the leaf router and the root router, a graft message corresponding to the stateless probe being sent from the root router to the leaf router along the communication path, the graft message creating a bandwidth reservation within each router through which the graft message passes, each reservation having a bandwidth as large as the specified amount and being associated with an adjacent router, thereby establishing a reserved communication path which includes the root router, the leaf router, and the bandwidth for each of the routers along the path; and
- means for aggregating the established communication path with other established communication paths to the root router to form a reserved communication tree.

11. The system for creating a reserved communication tree as set forth in claim 10, wherein the means for aggregating:
- identifies links included within more than one of the established communication paths to the same root router, each of the links being a communication channel between respective adjacent routers in the established communication paths; and
- forms a combined bandwidth reservation for each of the links identified as being within more than one of the established communication paths to the same root router, the combined reservation being equal to a sum of reserved bandwidths required for each of the established communication paths.

12. The system for creating a reserved communication tree as set forth in claim 10 wherein an amount of the bandwidth requested by the probe is larger than a necessary amount, an excess bandwidth equaling a difference between the requested amount and the necessary amount.

13. The system for creating a reserved communication tree as set forth in claim 12, further including:
- intermediate routers, within the network and between the leaf and root routers, which, upon receiving a subsequent stateless probe requesting additional bandwidth, determines if the additional bandwidth is one of less than and equal to the excess bandwidth reserved between the intermediate router and the root router;

wherein if the additional bandwidth is one of less than and equal to the excess bandwidth reserved between the intermediate router and the root router, returning a second graft message to a respective leaf router without forwarding the subsequent stateless probe to a next intermediate router; and wherein if the additional bandwidth is greater than the excess bandwidth reserved between the intermediate router and the root router, sending the subsequent stateless probe to a subsequent intermediate router.

14. The system for creating a reserved communication tree as set forth in claim 10, further including:

intermediate routers, within the network and between the leaf and root routers, included along the communication path.

15. The system for creating a reserved communication tree as set forth in claim 14, wherein:

an identifier for each of the intermediate routers through which each of the stateless probes passes is recorded in the respective stateless probe; and the corresponding graft messages are returned to the leaf router as a function of the router identifiers recorded in the stateless probes.

16. The system for creating a reserved communication tree as set forth in claim 10, further including:

means for sending messages between adjacent routers at periodic time intervals for refreshing the reservations; and means for deleting reservations for routers which have not been refreshed within a specified number of the periodic time intervals.

17. The system for creating a reserved communication tree for state aggregation as set forth in claim 10, further including:

means for sending tear-down messages from respective ones of the routers to respective adjacent routers, for enabling the adjacent routers to delete a reservation before the specified number of the periodic time intervals.

18. The system for creating a reserved communication tree as set forth in claim 10, further including:

means for detecting any failed routers in the established communication paths;

means for discovering alternate partial communication paths including alternate routers for by-passing the respective failed routers; and means for establishing reservations on the new partial paths for bypassing the failed routers.

19. The system for creating a reserved communication tree as set forth in claim 10, wherein the stateless probe is routed through the routers in the network for discovering the communication path, each of the routers through which the stateless probe passes determining if the router is capable of accommodating the reservation, and if the router is capable of accommodating the reservation, the router routing the stateless probe to a subsequent router in the network.

20. A method for establishing and aggregating reserved communication paths within a network, comprising:

a) sending respective stateless probes, each requesting a size of reserved bandwidth, from respective leaf routers toward a root router, the stateless probes determining respective communication paths, potentially including intermediate routers, between the respective leaf router and the root router;

b) returning respective response messages from the root router to the leaf routers along the respective communication paths;

c) creating bandwidth reservations on the respective links between adjacent ones of the routers in the respective communication paths, each of the bandwidth reservations as large as the respective requested size; and d) aggregating the established communication paths to form a communication network.

21. The method for establishing and aggregating reserved communication paths as set forth in claim 20, wherein the step a) includes:

e) requesting a bandwidth greater than a required amount.

22. The method for establishing and aggregating reserved communication paths as set forth in claim 21, further including:

f) receiving a subsequent stateless probe, requesting an additional amount of reserved bandwidth, into one of the routers;

g) determining if the router has reserved sufficient excess bandwidth between the router and the root router for accommodating the requested additional bandwidth;

h) if the router has reserved the sufficient excess bandwidth, returning a corresponding response message to the leaf router without forwarding the stateless probe to a next router; and i) if the router has not reserved the sufficient excess bandwidth, sending the subsequent stateless probe to the next router, and repeating the steps f) through i) until one of i) a router capable of accommodating the additional bandwidth is identified and ii) the stateless probe reaches the root router.

* * * * *